UNITED STATES PATENT OFFICE.

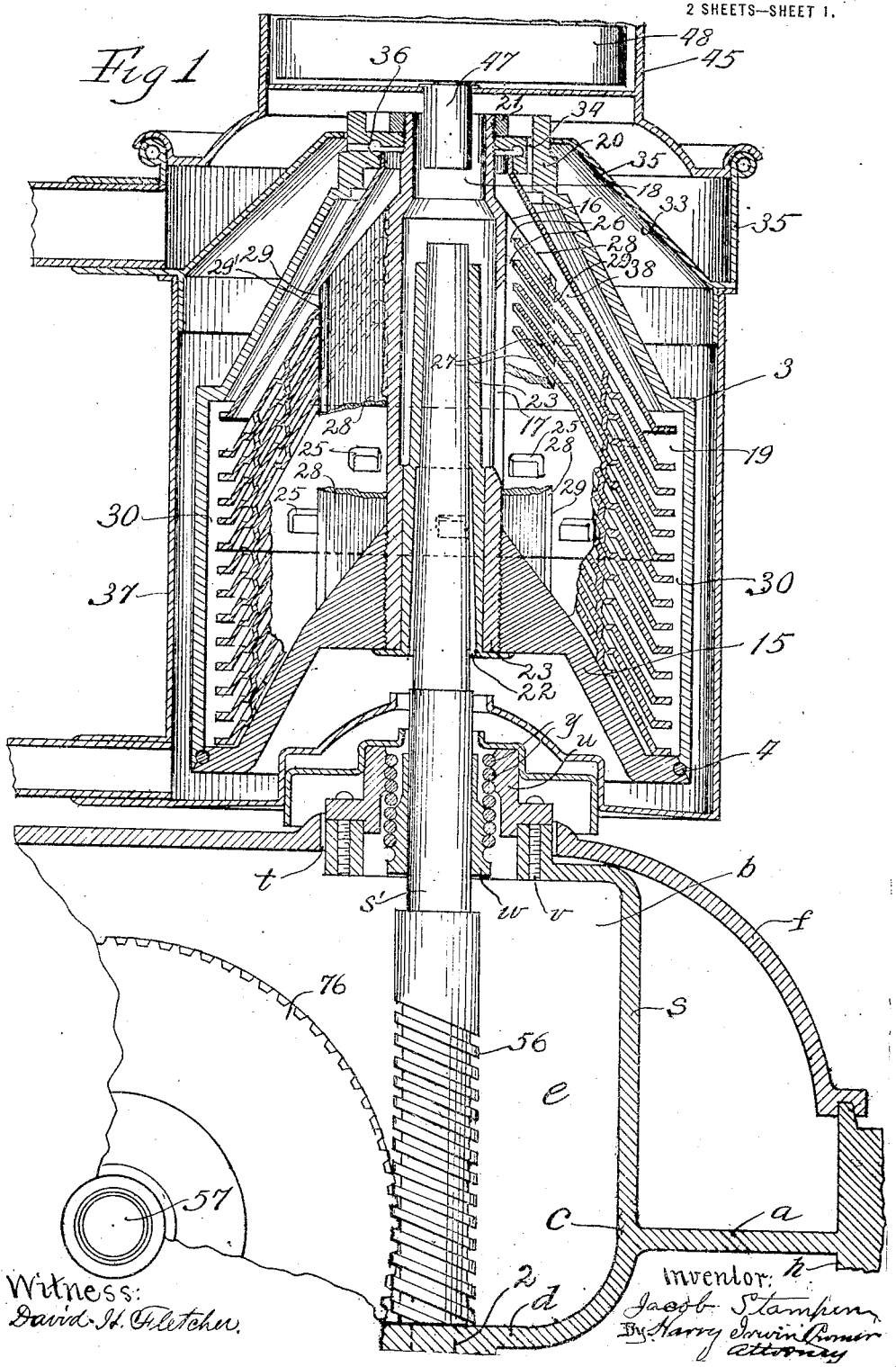

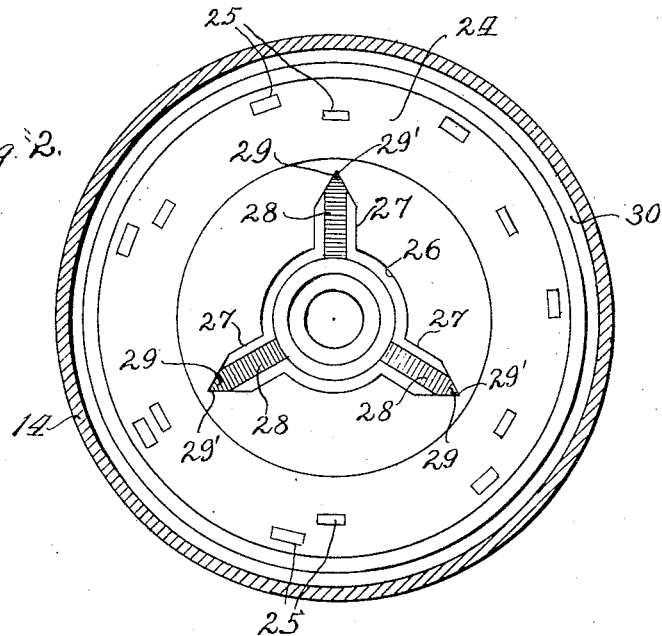
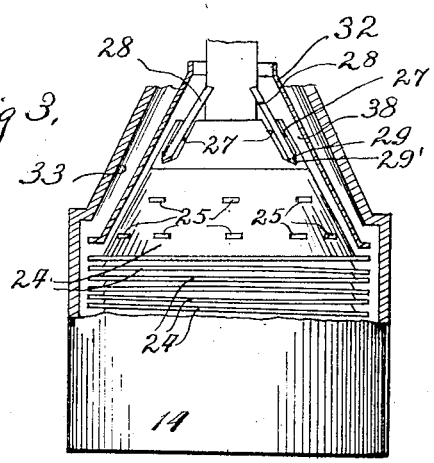

JACOB STAMPEN, OF CHICAGO, ILLINOIS.

CREAM-SEPARATOR.

1,326,376.          Specification of Letters Patent.          Patented Dec. 30, 1919.

Original application filed September 7, 1915, Serial No. 49,273. Divided and this application filed April 21, 1919. Serial No. 291,597.

*To all whom it may concern:*

Be it known that I, JACOB STAMPEN, a citizen of the United States, residing in Chicago, in the county of Cook and State of Illinois, have invented certain new and useful Improvements in Cream-Separators, of which the following is a specification.

This invention relates to that class of cream separators, or centrifugal separating machines by means of which cream or butter fat, or relatively light particles may be separated from the relatively heavy particles of milk or liquid containing such particles to be separated.

The principal object of the invention is to provide a simple, economical and efficient cream separator.

A further object is to provide a separator having a bowl provided with separator plates adapted to enable the bowl to be well balanced automatically, or a self-balancing bowl and separator disks or plates adapted to be well balanced and readily cleaned.

Other and further objects of the invention will appear from an examination of the specification and from an inspection of the accompanying drawings which are made a part hereof.

The invention consists in the features, combinations, and details of construction herein described and claimed.

In the accompanying drawings Figure 1 is a view in central vertical section showing a separator bowl constructed in accordance with my invention, and showing the upper portion of the main frame or gear box and oil reservoir in central vertical section, with gear mechanism located in the oil-containing chamber, and with the milk and cream receptacles in place—the lower part of the machine being omitted or broken away.

Fig. 2 is a horizontal sectional view of the bowl, as the same would appear taken on line 2—2 of Fig. 1 looking downward, but showing the separator disks or top separator plate, hollow shaft and accelerator blades in plan view, with said blades in engagement with the plates and showing the annular space between the hollow shaft and the inner edges or perimeters of the disks, and the space between the outer edges or peripheries of the disks and the wall of the bowl shell; and Fig. 3 is a view of reduced size in side elevation of the bowl shown in Figs. 1 and 2, with the upper part of the bowl shell broken away, so as to show the separator disks or plates in side elevation and tipped or tilted with respect to each other, to illustrate their relatively tilted or slightly inclined positions into which they are adapted to be moved or tilted with respect to each other when the bowl and disks are in balanced position or in operation, the extent of inclination or tilting of such disks as are shown tilted, being exaggerated for the purpose of illustration.

This application is a division of a pending allowed application Serial No. 49,273, filed September 7, 1915, by Jacob Stampen, for an improvement in cream separators, on which Letters Patent of the United States have issued April 22, 1919, numbered 1,301,756.

In constructing a cream separator or centrifugal machine in accordance with my invention, I provide a main frame $a$, comprising a gear box or oil-containing compartment having side walls $b$, end walls $c$ and a base $d$. The gear chamber or oil reservoir $e$ thus formed is provided with a cover $f$ which is removably mounted on the main frame or gear-containing chamber in position to cover and inclose the same. The main frame or gear-containing casing $a$ is mounted upon a suitable support or frame $h$ which may be of any desired ordinary or well known or suitable form.

An inner, upwardly extending stationary frame portion $s$ is formed, by preference in one integral piece with the main frame $a$ and projects upward into or through the usual top opening $t$ in the cover $f$, in position to form a support for a yielding bearing, through which the vertical bowl-supporting spindle $s'$ extends.

The bottom end of the vertical spindle $s'$ is rotatively supported in a suitable bottom bearing 2 which may be of any ordinary, well known or desired form, and is therefore not shown or described in detail herein.

The upper yielding bearing or neck bearing comprises in its construction a stationary bearing member $u$ secured to said frame portion $s$ by means of screws $v$, or other suitable securing means, and having a central aperture through which the vertical spindle extends. A laterally movable vertically apertured sleeve or bearing member

$w$ encircles and forms a bearing for the spindle $s'$, and is adapted to move laterally with said spindle, and a resilient member $y$—which is here shown in the form of a helical spring-supported by the stationary bearing member $u$—forms a support for the movable bearing member $w$. This spring has its upper extremity secured to the stationary bearing member by being inserted or screwed into an inner helical groove or thread in the inner face of the member $u$, corresponding to the windings of the spring which is screwed into said helical groove; and the lower extremity of the spring is fitted to an outer lower helically grooved portion of the sleeve $w$, which is adapted to engage the inner sides of the lower windings of the spring, so that the sleeve is yieldingly supported by means of the spring. The movement of the sleeve $w$ and the spindle $s'$ laterally is thus permitted but yieldingly resisted by the spring, the sleeve $w$ being provided with a central aperture through which the spindle extends, as already suggested, and the stationary bearing member $u$ being provided with an aperture of sufficient diameter to admit the spring between the sleeve and said stationary member and permit lateral movement of the sleeve $w$ with respect to said stationary bearing member.

A rotative separator bowl is provided, which, when constructed as shown in the drawings, comprises a main body or cylindrical bowl shell 3 having side walls 14 made by preference integral with and forming the sides or peripheral wall portions of the upper member or cover of the bowl shell. The bottom extremity of the cylindrical wall portions or main body 14 of the bowl shell encircles, and is tightly, but, by preference, removably secured to the periphery of the bowl base or bottom member 15 of the bowl shell. A central hollow shaft 16 is provided, and, by preference, has its lower extremity secured to and in threaded engagement with the base 15, and extends vertically from the axial center of the base to the upper extremity of the bowl shell on the inside of and at the axial center of the same. This hollow shaft is provided with lateral openings 17 leading from the central hollow upper portion or milk inlet passage 18 into the liquid-containing separator chamber 19. The upper extremity of the hollow shaft 16 projects upward through a central opening in the upper portion 20 of the bowl cover or upper bowl member 14, and a threaded nut 21, is mounted in threaded engagement with the projecting upper threaded end of the hollow shaft, and in securing engagement with the top surface of the upper portion 20 of the bowl cover 14; and the latter is thus securely held in liquid-tight engagement with the base 15.

An ordinary packing ring 4 of rubber or similar compressible material is interposed between the adjacent peripheral portions of the cover member or main body of the bowl and the base, or bottom member.

A discharge spout 47 from a float cup 45 is controlled by a float 48. Said spout empties into the axial passage 18, and the float cup is in position to receive milk from an ordinary supply can.

The hollow shaft 16 is provided with an axial opening 22 in its lower extremity, which opening is, by preference, tapered and adapted to fit snugly upon the correspondingly tapered upper extremity of the vertical spindle $s'$ already described. For convenience in construction, a bushing 23 is inserted in the hollow bottom end of the hollow shaft and in position to extend upward on the inside of the latter and at its axial center, to a point near the upper extremity of the hollow shaft and above the center of the bowl; and the tapered opening 22 is formed in said bushing. The separator bowl is thus supported in fixed relation to and is adapted to rotate with the vertical spindle, and to be readily removed and replaced.

A series of superposed separator disks or plates 24, which are truncated-cone-shaped, and spaced apart by means of spacing bosses 25,—which are by preference, integral with the body of the separator disk of which they form a part, and each of which projects downward and inward from and beyond the bottom inner surface of the disk of which it forms a part, are mounted on the inside of the bowl shell, in the separator chamber 19, and in position to encircle the hollow shaft. Each of said separator disks or plates is provided with a central aperture 26 through which the hollow shaft extends. These central or axial openings 26 are of larger diameter than the outer diameter of the cylindrical hollow shaft 16, and the outer peripheries or peripheral edges of the disks are of less diameter than the inner cylindrical encircling wall or inner face of the wall 14 of the bowl shell where said wall encircles said disks. Each separator disk or plate 24 has, by preference three radial notches 27 leading from the inner edge or perimeter of the disk outward radially and spaced apart equally, and with their outer extremities at equal distances from the axial center of the disk. These radial notches 27, of which there are a plurality—preferably three—in each disk, equally spaced apart circumferentially or around the axis of the disk, are all of identical shape—V-shaped—at their outer extremities; and the bodies of the disks are all alike throughout the portions thereof in which the outer extremities of the radial notches or slots 27 are located. And, by preference, all are of the same form and dimensions throughout. The points or outer extremities of the three radial notches 27 of each disk are triangular or V-shaped, and are so located with respect to each other that each forms the corner, angle or vertex of a true triangle, the center of which is the axial center of the disk and the axis of rotation of the disks and bowl, said extremities and the triangle having the outermost points thereof all normally located in a plane substantially or approximately perpendicular to the axis of the disk and at equal distances from the axial center of the disk, said plane being parallel with and between the planes of the upper and lower edges of the disks or separator plates.

The hollow shaft 16 extends vertically through the entire series of disks or separator plates 24 at the axial center of the bowl shell and centrally through the axial openings 26 and entirely out of contact with the inner circular edges or perimeters of the disks or separator plates. And a series of upright radial accelerator blades 28—by preference three in number—extend vertically through the radial notches 27 in the disks, and through all of the disks or separator plates, and are, by preference, secured to or made integral with the hollow shaft 16, and project outward radially from said shaft and into said notches.

These radial blades 28 are all spaced apart equally and uniformly around the axial center of the hollow shaft and bowl shell; and each of the plurality of radial blades has an upright triangular or V-shaped outer edge 29 which extends vertically through the corresponding radially notched portions of the entire series of disks or plates, said vertical edges being spaced apart uniformly circumferentially or at equal distances from each other around the axial center of the bowl shell and hollow shaft. They are thus all located at equal distances from the axial center of the bowl shell and hollow shaft and in parallel relation to each other, and in parallel relation to said axial center of the bowl shell and hollow shaft. These upright outer edges 29 of the radial blades are each in close but sliding engagement with the adjacent V-shaped extremities 29' of all of the radial notches 28 through which such blade or triangular edge extends.

Each disk or separator plate 24 thus has three contact points in the form of three V-shaped extremities 29' of its radially notched portions in close but sliding engagement with the three upright parallel triangular edges 29 of the upright radial blades 28; and each disk or plate is in engagement with said blades at said three points only; and the vertical edges of the blades form three vertical lines of contact which are parallel with and all at equal distances from the axial center of the bowl shell and hollow shaft, as already suggested; and the sides of the blades, the periphery of the hollow shaft, and the inner peripheral surface or perimeters of the plates are all out of contact with each other, and the inner peripheral surface of the outer peripheral wall of the bowl shell is also out of contact with the disks or separator plates and adapted to provide spaces between the peripheries of the disks and the wall of the bowl shell and between the hollow shaft and blades and the disks through which liquid may pass when the separator is in operation.

The three points of contact on each disk are all in the same plane, and are, by preference, all in or near the same horizontal plane in which the center of gravity of the disk or separator plate is located, said plane being between and parallel with the planes of the top and bottom circular edges of the disk, said edges being in parallel planes as shown.

Each separator plate or disk is in sufficiently close sliding engagement with the edges of the radial blades at its three points of contact 29' to prevent any movement of such disk or separator plate transversely into contact with the side wall or peripheral wall of the bowl shell or into contact with the periphery of the hollow shaft, or transversely of the bowl, or away from concentric position with respect to the axial center of the hollow shaft and bowl shell, or transversely in the same plane in which such three points of contact 29 of any given disk are located.

From the foregoing description, it will be readily seen that separator plates are all held with their outer peripheral edges entirely out of contact or engagement with the peripheral side walls of the bowl shell, and, by preference, with their inner edges or perimeters also entirely out of contact with the hollow shaft or any other adjacent part, so that the disks are free and entirely out of contact at both their inner and outer edges with all other parts and unobstructed and free to move upward or downward or to tilt to any inclined position or to horizontal position from any tilted or inclined position while being retained in concentric position by the upright radial blades, and that, even when slightly tilted at an angle with respect to the axial center of the bowl shell, each separator plate or disk will have three points of contact 29' in contact with three corresponding parallel edges 29 of the radial blades, all of which edges are parallel with and at equal distances from the axial center of the bowl shell, and hollow shaft, and have a constant unvarying relation to said axial center, and that each disk has no other point of contact other than the next adjacent disks, and the contact of the bottom disk with the bottom of the bowl, or the possible engagement of the top disk with the part 32 above it when such top plate or separator disk is tilted or raised from its normal position, as it is permitted to be raised or tilted, by reason of the unobstructed space between it and said part 32.

An unobstructed annular passage 30 is thus provided between the outer peripheries of the disks or separator plates and the bowl shell adapted to permit the proper flow of skimmed or separated milk through said passage 30 and through the space 31 between the top liner plate 32 and the conical upper wall or top 33 of the bowl shell, and out through the skimmed milk discharge passage 34 into the milk cover or receptacle 35.

The inner edges of the disks being entirely out of contact with the hollow shaft, an annular unobstructed space is provided between said inner edges and the hollow shaft adapted to permit the passage of lighter particles of cream through the openings 26 in the separator plates and upward through the annular passage thus formed around the hollow shaft, and on the inside of the plate 32 and out through the cream outlet or outlets 36 into the cream receptacle 37.

The top liner plate 32, which is without radial notches, and extends over the radial blades and over the topmost notched separator plate 24, is spaced apart from the latter, or, in other words, mounted a sufficient distance above the initial or normal position of the topmost notched separator plate to provide a space 38 between said plate 32 and said topmost separator plate, which space is adapted to permit the separator plates to rise slightly and to automatically assume the slightly raised or tilted positions, or inclined positions relatively to each other or to the vertical axis of rotation, but retained in concentric relation to said axis of rotation by the points of contact between the radial blades and the separator disks at the contact points 29', with liquid flowing between the plates and against their concave surfaces, so as to tend to raise each of the plates slightly and yet permit each plate to assume its properly balanced self-balancing position concentric with respect to the axis of rotation of the disks and bowl while the disks and bowl are in rapid rotation about the same axis, and the spindle yieldingly held in position by its yielding or neck bearing as described and shown.

Each disk is thus free to the greatest possible extent to assume its own properly balanced position automatically while the disks and bowl are in rapid rotation. The disks thus are each permitted the required freedom of movement upward or downward or to tilted or inclined position and from tilted or inclined position to horizontal position, or each to its properly balanced position substantially concentric with the axis of rotation, so as to become automatically balanced and to be as far as possible free to retain its proper balanced position like a gyrostat, and so as to resist any force tending to throw or cause it to be forced or permitted to move out of its properly balanced position while in rapid rotation in the manner of a gyrostat or gyroscope.

Each disk is thus enabled to act in the manner of a gyroscope or gyrostat to assume its properly balanced position while in rapid rotation, and to act like a gyrostat in resisting any tendency to cause it to become unbalanced while in rotation or operation. A well balanced and automatically balanced or self-balancing bowl is thus obtained.

The spindle $s'$ has a worm 56 thereon which is driven by a worm wheel 76 on a drive shaft 57 rotatively mounted in suitable bearings.

The driving gear may be of any desired known or suitable form.

I claim:

1. In a separator of the class described, the combination of a rotary bowl shell having liquid inlet and outlet openings, a series of superposed truncated-cone-shaped separator disks located inside of and in concentric relation to the bowl shell and having their peripheral edges spaced apart with respect to and out of contact with and movable upward and downward with respect to the walls of the bowl shell, a plurality of upright radial blades mounted in fixed relation to the bowl shell and having parallel upright disk-engaging edges spaced apart equally around and at equal distances from the axis of the bowl shell and each in sliding engagement with and acting to hold the disks against lateral movement with respect to the bowl shell and permit the tilting and upward and downward movement of the disks to balanced position, an upper bowl member located above and normally out of contact with the top disk of the series, said top disk being provided with an unobstructed space between it and said upper bowl member adapted to permit the free tilting and upward movement of the disks to balanced position, with their outer peripheral edges out of contact with and free to move upward and downward with respect to the bowl shell, and means for rotating the bowl.

2. In a separator of the class described, the combination of a rotary bowl shell having liquid inlet and outlet openings, a series of superposed truncated-cone-shaped separator disks located inside of and in concentric relation to the bowl shell, each of said disks having radial notches in its inner perimeter, the outer extremities of said notches being in a plane between and parallel with respect to the planes of the top and bottom edges of such disk, the peripheral edges of said disks being out of contact with and movable upward and downward with respect to the walls of the bowl shell, a plurality of upright blades mounted in fixed relation to the bowl shell and having parallel upright disk-engaging edges spaced apart equally around and at equal distances from the axis of the bowl shell and at equal distances from the peripheries of the disks, each of said edges being in sliding engagement with and acting to hold the disks against transverse movement with respect to the bowl shell in a plane perpendicular to the axis of rotation of the bowl shell, and adapted to permit the tilting and upward and downward movement of the disks with respect to the bowl shell to balanced position, the top disk being provided with a space between it and the top of the bowl shell adapted to permit the free tilting and upward and downward movement of the disks with respect to each other and with respect to the bowl shell to balanced position concentric to the axis of rotation of the bowl shell and disks, with their peripheral edges out of contact with and free to move upward and downward with respect to the bowl shell, and means for rotating the bowl.

3. In a separator of the class described, the combination of a rotary bowl shell having liquid outlet openings, a series of superposed truncated-cone-shaped separator disks located inside of and in concentric relation to the bowl shell, each of said disks having its hollow or concave side downward and having radial notches in its inner perimeter, the outer extremities of said notches being in a plane between and parallel with respect to the planes of the top and bottom circular edges of the disk, the peripheral edges of said disks being spaced apart with respect to and entirely out of contact with the walls of the bowl shell, a plurality of upright radial blades mounted in fixed relation to the bowl shell and having parallel upright disk-engaging edges spaced apart equally around and at equal distances from the axis of the bowl shell and each in sliding engagement with and acting to hold the disks against transverse movement with respect to the bowl shell and permit the tilting and upward and downward movement of the disks to balanced position out of contact with the side walls of the bowl shell, the points of contact between said blades and the disks being at the outer extremities of said radial notches only, the top disk being spaced apart with respect to the top of the bowl shell, to permit the free tilting and upward and downward movement of the disks with respect to each other and with respect to the bowl shell to balanced position with their inner and outer perimeters out of contact with all other parts and free to move upward and downward with respect to the bowl shell, means for admitting liquid between the disks at the central portions thereof in position to engage the downwardly and outwardly inclined bottom faces of the disks, and means for rotating the bowl shell and disks.

4. In a separator of the class described, the combination of a rotary bowl shell having liquid inlet and outlet openings, a series of superposed truncated-cone-shaped separator disks located inside of and in concentric relation to the bowl shell, each of said disks having radial notches in its inner perimeter, the outer extremities of which notches are in a plane between and parallel with respect to the planes of the top and bottom edges of such disk, the peripheral edges of said disks being out of contact with and movable upward and downward with respect to the walls of the bowl shell, an axial hollow shaft fixed to the bowl shell and extending through and in concentric relation to and entirely out of contact with the series of disks and provided with an unobstructed annular space between said hollow shaft and the inner perimeters of the disks, a plurality of upright radial blades fixed to the hollow shaft and having parallel upright disk engaging edges spaced apart equally around and at equal distances from the axis of the bowl shell and at equal distances from the peripheries of the disks, the points of contact between said blades and disks being at the outer extremities of said radial notches and blades, an inner liner plate fixed to the bowl shell above and spaced apart with respect to the top disk of said series, said top disk being provided with a space between it and said fixed top liner plate and adapted to permit free tilting and upward and downward movement of the disks with respect to each other and with respect to the bowl shell to balanced position with their peripheries out of contact with and freely movable with respect to the walls of the bowl shell, and means for rotating the bowl.

5. In a separator of the class described, the combination of a rotary bowl shell having liquid inlet and outlet openings, a series of superposed truncated-cone-shaped separator disks located inside of and in concentric relation to the bowl shell and each having three radial notches in its inner perimeter, the outer extremities of said notches being in a plane between and parallel with respect to the planes of the top and bottom circular edges of the disk, the peripheral edges of said disks being spaced apart with respect to each other and with respect to the walls of the bowl shell and entirely out of contact with the latter, three radial upright blades mounted in fixed relation to the bowl shell and having parallel upright disk-engaging edges spaced apart equally around and at equal distances from the axis of the bowl shell and each in sliding engagement with and acting to retain the disks in concentric position and against transverse movement with respect to the bowl shell and permit the tilting and upward movement of the disks to balanced position out of contact with the side walls of the bowl shell, the points of contact between said blades and disks being at the outer extremities of said notches and blades, an upper liner plate located above and spaced apart with respect to the top disk of said series, to permit the tilting and upward and downward movement of the disks with respect to each other and with respect to the bowl shell to balanced position, with their peripheral edges out of contact with and freely movable upward and downward with respect to the walls of the bowl shell, an upright rotary spindle upon which the bowl shell is mounted, means for supporting the bottom of the spindle, a yielding upper bearing in engagement with and adapted to permit and yieldingly resist the transverse movements of the spindle, and means for rotating the spindle.

Signed at Chicago, Illinois, April 19, 1919.

JACOB STAMPEN.

Witnesses:
HARRY I. CROMER,
W. HARDING.